(12) United States Patent
Wolff et al.

(10) Patent No.: US 9,007,761 B2
(45) Date of Patent: Apr. 14, 2015

(54) POST AND OPENING WITH MAGNETIC ELEMENTS TO FACILITATE ALIGNMENT

(71) Applicant: Hewlett-Packard Development Company, LP, Fort Collins, CO (US)

(72) Inventors: Stacy L Wolff, Houston, TX (US); Michael Delpier, Houston, TX (US); Kevin Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 13/756,102

(22) Filed: Jan. 31, 2013

(65) Prior Publication Data

US 2014/0211409 A1 Jul. 31, 2014

(51) Int. Cl.
*G06F 1/16* (2006.01)

(52) U.S. Cl.
CPC ............ *G06F 1/1632* (2013.01); *G06F 1/1679* (2013.01)

(58) Field of Classification Search
USPC ........................... 361/679.43, 679.58, 679.56
See application file for complete search history.

(56) References Cited

U.S. PATENT DOCUMENTS

| 5,812,356 | A | * | 9/1998 | O'Connor ...................... 361/179 |
| 5,857,157 | A | * | 1/1999 | Shindo .......................... 455/551 |
| 6,007,363 | A | * | 12/1999 | Renk ............................. 439/378 |
| 6,480,377 | B2 | * | 11/2002 | Genest et al. ............. 361/679.43 |
| 6,510,048 | B2 | * | 1/2003 | Rubenson et al. ........ 361/679.09 |
| 6,655,985 | B2 | * | 12/2003 | Huang et al. .................. 439/533 |
| 7,079,384 | B2 | * | 7/2006 | Wang et al. .............. 361/679.43 |
| 8,305,741 | B2 | * | 11/2012 | Chatterjee ................ 361/679.02 |
| 8,484,809 | B2 | * | 7/2013 | Fiedler ............................ 24/303 |
| 8,690,582 | B2 | * | 4/2014 | Rohrbach et al. ............... 439/39 |
| 8,699,215 | B2 | * | 4/2014 | Whitt et al. ............... 361/679.21 |
| 2002/0163778 | A1 | * | 11/2002 | Hazzard et al. ................ 361/683 |
| 2004/0209489 | A1 | * | 10/2004 | Clapper .......................... 439/39 |
| 2012/0028480 | A1 | | 2/2012 | Bilbrey et al. |

* cited by examiner

*Primary Examiner* — Lisa Lea Edmonds
(74) *Attorney, Agent, or Firm* — Hewlett-Packard Patent Department

(57) ABSTRACT

An example provides a computing device including an opening including a first magnetic element, and a computing base, comprising a post including a second magnetic element attracted. The post may insert into the opening to facilitate docking the computing device to the computing base, the first magnetic element and the second magnetic element to facilitate alignment of the post with the opening.

18 Claims, 8 Drawing Sheets

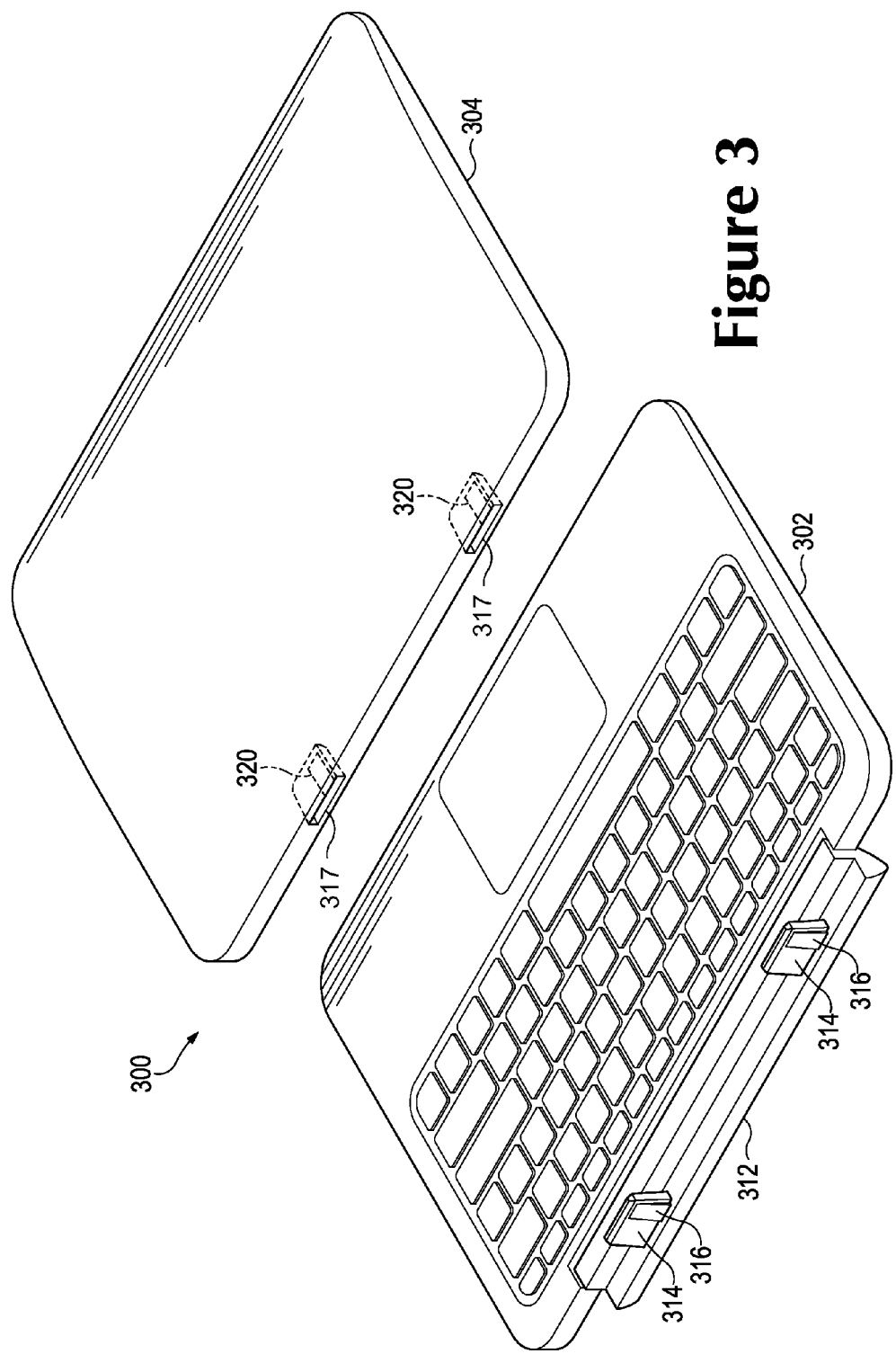

POST AND OPENING WITH MAGNETIC ELEMENTS TO FACILITATE ALIGNMENT

BACKGROUND

Portable computing devices are available in a wide range of form factors. In some instances, a portable computing device may be docked to another device. Docking a portable computing device to another device may allow the portable computing device to temporarily transform to a desktop or notebook computer without sacrificing the portability option.

BRIEF DESCRIPTION OF THE DRAWINGS

The detailed description section references the drawings, wherein:

FIG. 3 shows a computing system including an example computing base having a post with a magnetic element and an example computing device having an opening with a magnetic element, in accordance with various implementations;

DETAILED DESCRIPTION OF EMBODIMENTS

Portable computing devices are broadly utilized. These devices generally support a variety of applications such as, for example, e-mail, text messaging, calendars, internet browsing, and word processing. Some include additional components such as telephones and cameras.

In some it may be desirable to dock a portable computing device to another device. For example, a tablet computing device may be docked to a keyboard to allow a user to have the benefits of a notebook computer. Docking sometimes requires a user to visually align and then mate a docking connector with a docking port.

Described herein are embodiments of a computing device including an opening including a first magnetic element, and a computing base comprising a post including a second magnetic element attracted to the first magnetic element. The post may insert into the opening to facilitate docking the computing device to the computing base, the first magnetic element and the second magnetic element to facilitate alignment of the post with the opening.

Figure 1:
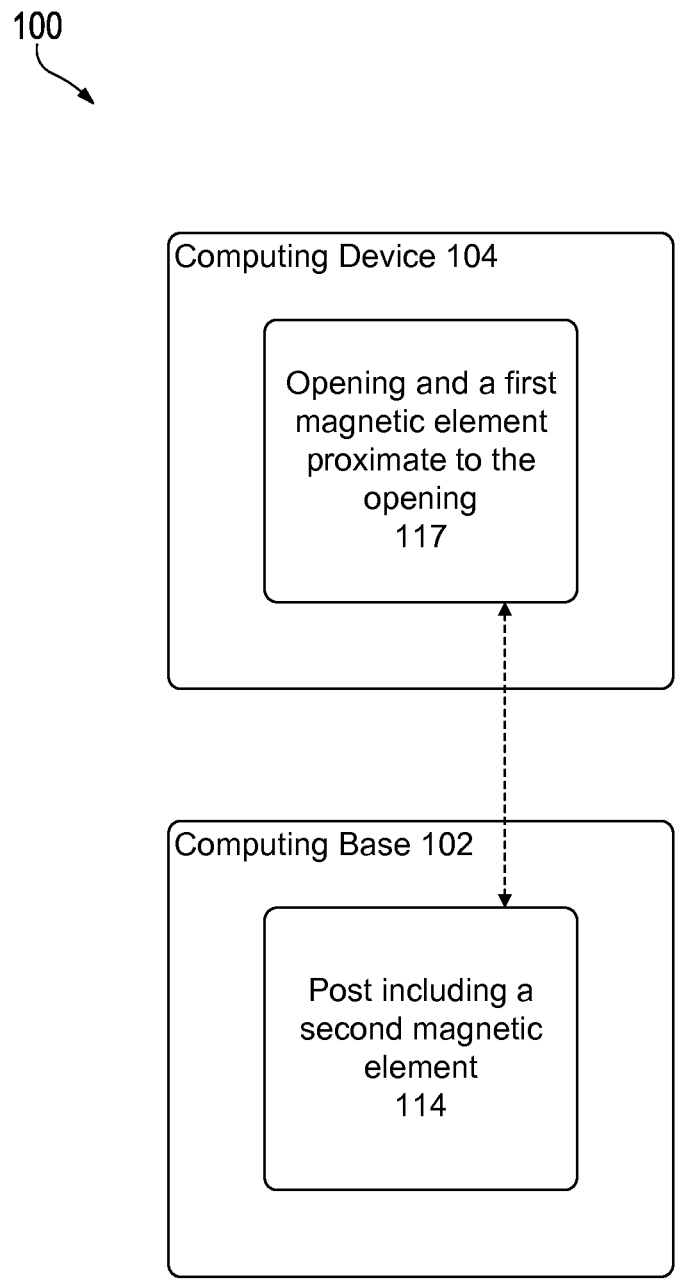
FIG. 1 shows a computing system including an example computing base having a post with a magnetic element and an example computing device having an opening with a magnetic element in accordance with various implementations.

An example computing system 100 including a computing base 102 and a computing device 104, in accordance with various embodiments, is shown in FIG. 1. The computing device 104 may include an opening 117 and the computing base 102 may include a connection interface 112 having a post 114 to insert into the opening 117 to facilitate docking the computing device 104 to the computing base 102. In various examples described herein, the opening 117 may include a first magnetic element and the post 114 may include a second magnetic element attracted to the first magnetic element to facilitate gross alignment of the computing device 104 with the computing base 102 when docking the computing device 104 to the computing base 102.

Figure 2A:
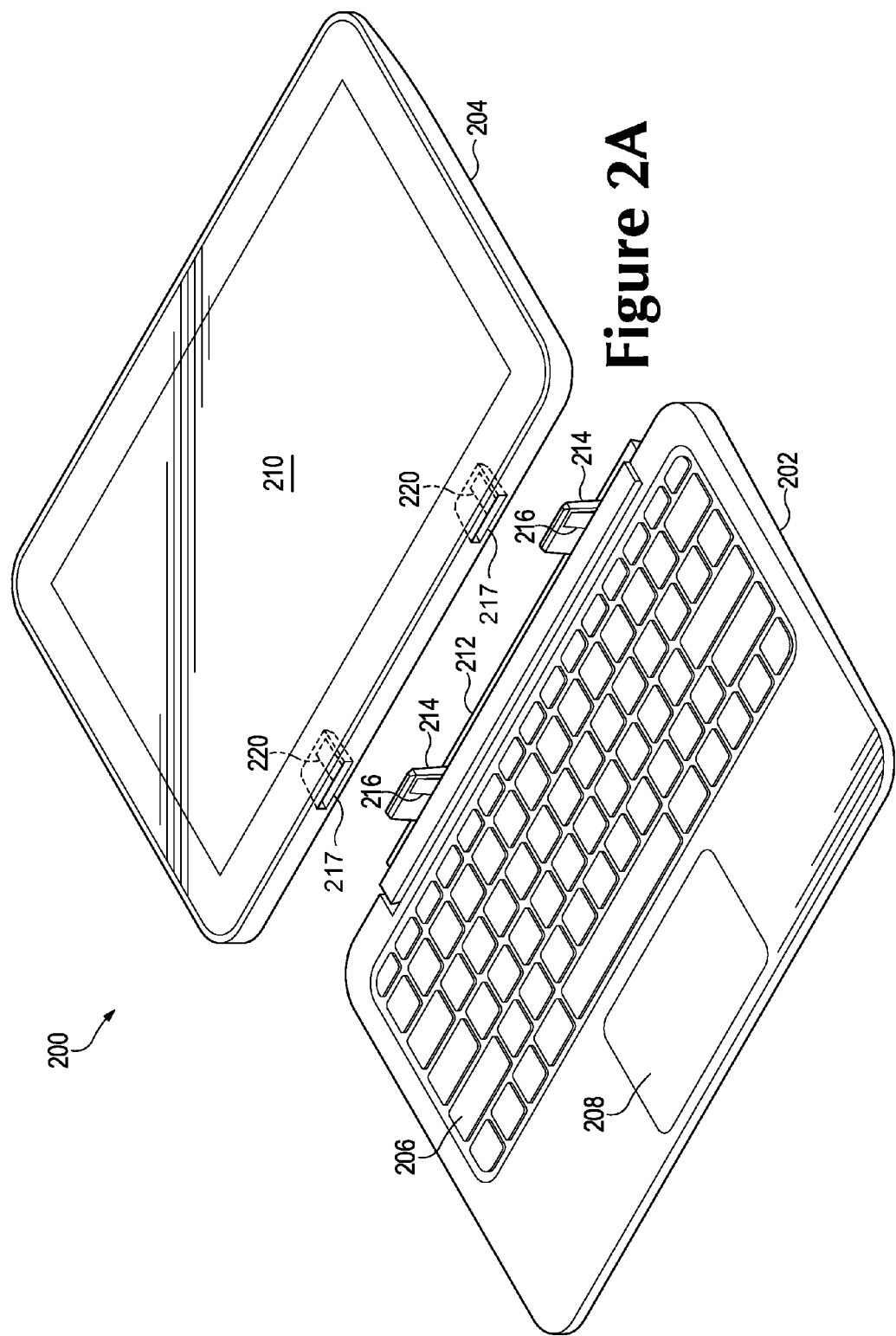
FIGS. 2A-2C show various views of a computing system including an example computing base having a post with a magnetic element and an example computing device having an opening with a magnetic element, in accordance with various implementations.
Figure 2B:
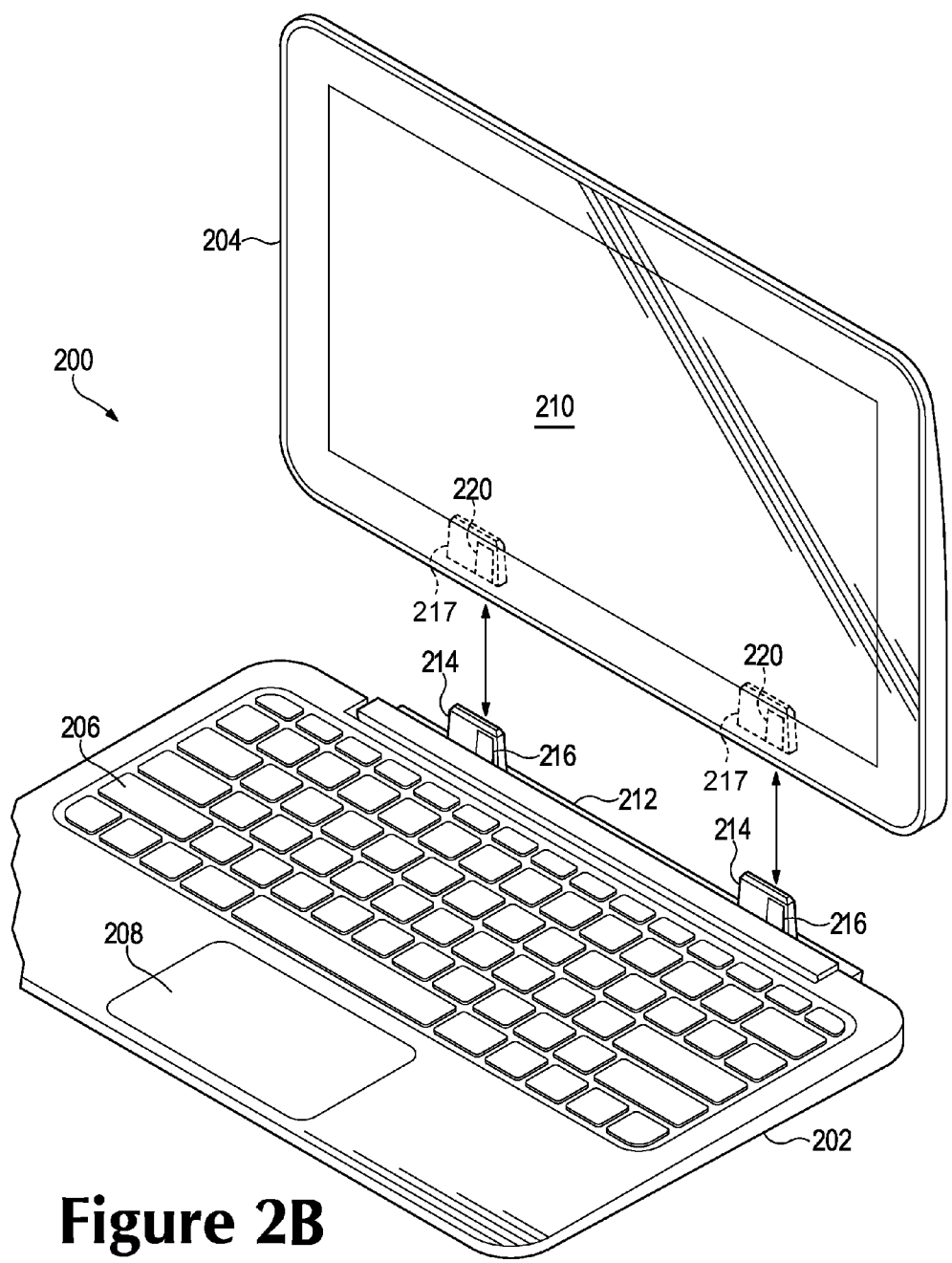
Figure 2C:
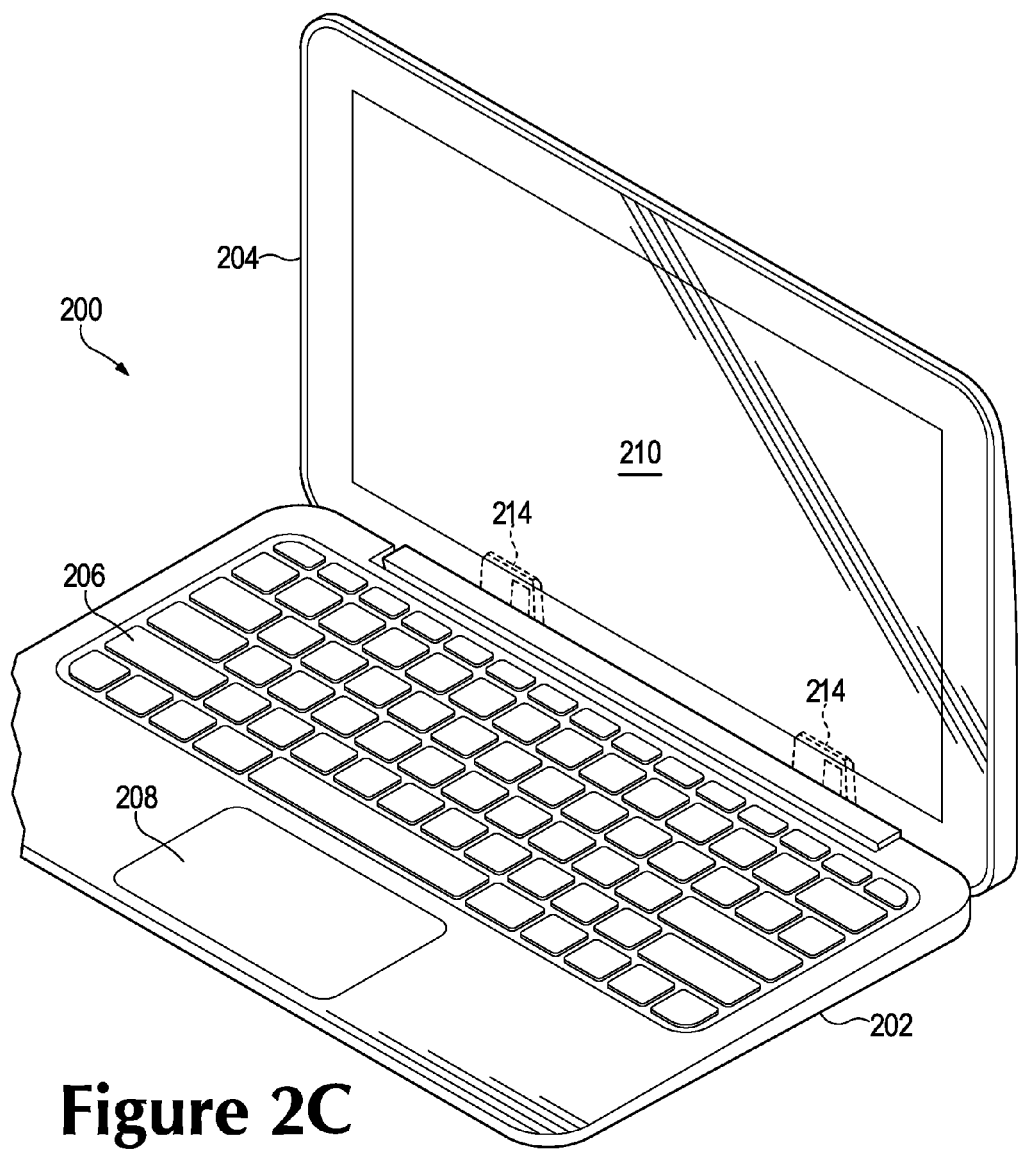

Another example computing system 200 including a computing base 202 and a computing device 204, in accordance with various embodiments, is shown in FIGS. 2A-2C. The computing base 202 may include a connection interface 212 including a post 214, and the computing device 204 may include a housing having a corresponding opening 217. In various examples described herein, the post 214 of the connection interface 12 may insert into the opening 217 to facilitate docking the computing device 204 to the computing be 202, as shown in FIGS. 2B and 2C. As described herein, the post 214 and the opening 217 may be configured to facilitate gross alignment of the computing device 204 with the computing base 202 when docking the computing device 204 to the computing base 202.

The computing device 204 may be any device configured to connect with another device such as the computing base 202. Examples of the computing device 204 may include, but are not limited to, handheld computers, tablet computers, display devices, digital recorders, smart phones, personal digital assistants, mobile phones, digital media players, televisions, or digital cameras. As shown in FIGS. 2A-2C, for example, the computing device 204 may be a tablet computer, including a display 210, configured to dock to the computing base 202.

The computing base 202 may be any device configured to connect with another device such as computing device 204. Examples of the computing base 202 may include, but are not limited to, docking stations, keyboard docks, servers, set-top boxes, game consoles, digital media players, or digital cameras. As shown in FIGS. 2A-2C, for example, the computing system 200 may be transformer/convertible-type computer including a computing base 202 comprising a keyboard dock, with a keyboard 206 and touchpad mouse 208 to dock to the computing device 204.

To facilitate gross alignment of the computing device 204 with the computing base 202 when docking the computing device 204 to the computing base 202, the post 214 of the computing base 202 and the opening 217 of the computing device 204 may each include magnetic elements. In the example shown in FIGS. 2A-2C, for example, the post 214 may include a magnetic element 216 and the opening 217 may include a magnetic element. 220 proximate to the opening 217. As shown in FIG. 2B, as the computing device 204 and the computing base 202 are moved closer to each other for docking, the magnetic elements 216, 220 may be attracted to each other to help guide the computing device 204 to the appropriate orientation for docking with the computing base 202. The gross alignment facilitation provided by the magnetic elements 216, 220 may provide easier alignment of the computing device 204 with the computing base 202 than visual alignment alone.

In various examples, one of the magnetic elements 216, 220 may be magnetized while the other one of the magnetic elements 216, 220 may be an unmagnetized magnetic element. Materials suitable for forming the magnetic elements may include, but are not limited to, ferromagnetic materials, ferrimagnetic materials, or paramagnetic materials. Ferromagnetic materials may include, but are not limited to iron, nickel, cobalt, alnico (aluminum/nickel/cobalt alloy), or alloys thereof. Ferrimagnetic materials may include, but are not limited to, magnetite, yttrium iron garnet, or magnetic iron oxides (such as, e.g., iron oxides of aluminum, cobalt, nickel, manganese, or zinc). In various examples in which one of the magnetic elements 216, 220 is a magnet, the magnet may comprise a magnetic material that has been magnetized to have a persistent magnetic field. In other examples, the magnetic elements 216, 220 may comprise an electromagnet.

In various examples, the magnetic element 220 of the opening 217 may form, at least in part, a sidewall of the opening 217. In other examples, the magnetic element 220 may be covered by a sidewall of the opening 217 (not shown).

In various examples, a computing base 202 may include one post 214 or more than one post 214. Likewise, the computing device 204 may include one opening 217 or more than one opening 217. As shown, for example, the computing base 202 includes a pair of posts 214 and the computing device 204 includes a corresponding pair of openings 217. As also shown, each of the posts 214 includes a magnetic element 216, and each of the openings 217 includes a magnetic element 220. In other examples, fewer than all posts 214 may include the magnetic element 218, fewer than all openings 217 may include the magnetic element 220, or both. In some examples, the post 214 may be configured to extend along a greater distance along the length of the connection interface 212 than that shown in FIGS. 2A-2C. In some embodiments, for example, the connection interface 214 may include one elongated post 214 instead of two separate smaller posts 214. Various other configurations may be possible within the scope of the present disclosure.

FIG. 3 shows another example computing system 300 including an example computing base 302 having a post 314 with a magnetic element 316 and an example computing device 304 having an opening 317 with a magnetic element 320, in accordance with various embodiments.

For the example shown in FIG. 3, the magnetic elements 316, 320 are disposed on opposite sides of the post 314 and opening 317, respectively, as compared to the examples described herein with reference to FIGS. 1A-1C. In other words, rather than facing the keyboard of the computing base 302, the magnetic element 316 instead faces the opposite direction. The magnetic element 320 of the opening 317 is correspondingly configured to face the back of the computing device 304. Various other configurations may be possible within the scope of the present disclosure.

Figure 4:
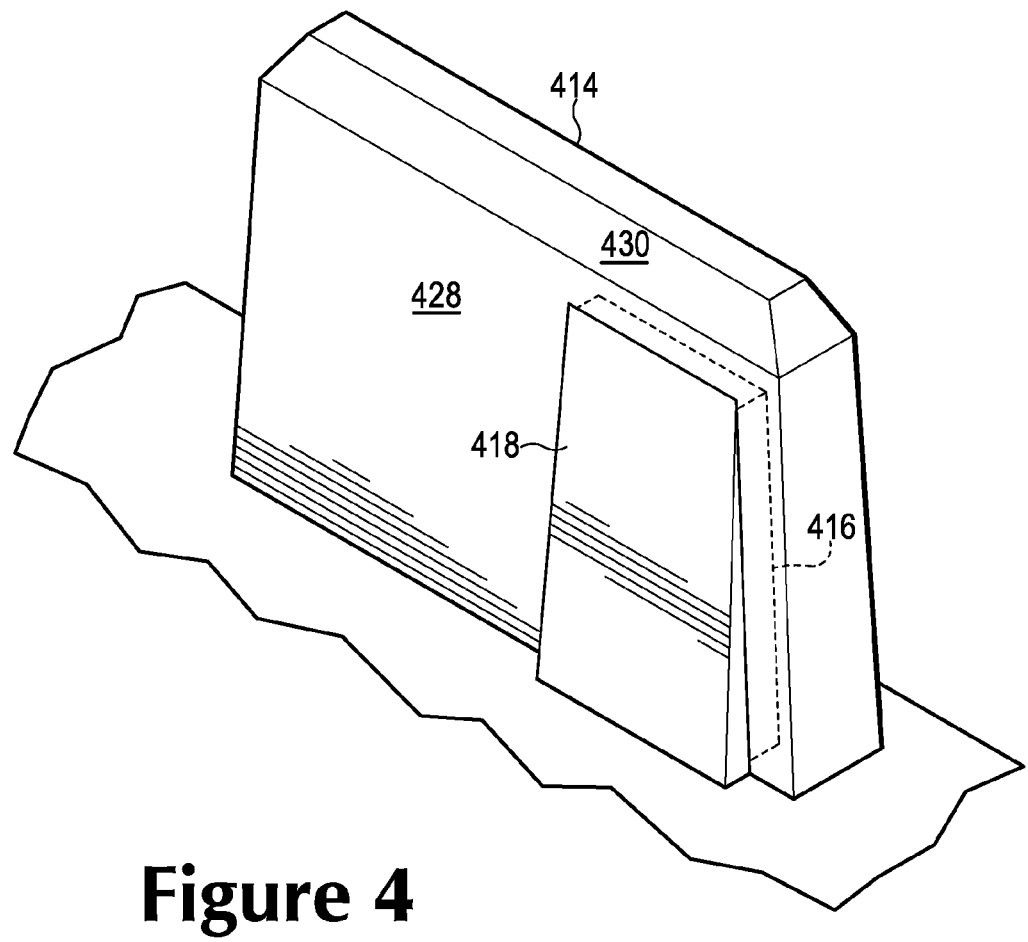
FIG. 4 shows an example post with a magnetic element, in accordance with various implementations.

FIG. 4 shows a detailed view of an example magnetic post 414, in accordance with various embodiments. As described herein, the magnetic post 414 may be part of a connection interface of a computing base and May be configured to insert into a magnetic opening of a computing device to facilitate docking the computing device to the computing base.

As shown, the post 414 may include a magnetic element 416. In various examples, the magnetic element 416 may be embedded within or recessed into the post 414. The magnet 416 may be oriented in any manner to correspond to an orientation of a magnet of a computing device to provide magnetic attraction between the magnets sufficient for gross alignment of the computing base with the computing device. In various examples, the magnetic element 416 may be larger or smaller than that shown in FIG. 4. In other examples, part or all of the post 414 itself may be formed of a magnetic material.

The post 414 may include a plastic layer 418 covering at least a portion of the magnetic element 416. In various examples, the plastic layer 418 may help protect the magnetic element from damage such as, e.g., from docking the computing device to the computing base or during normal use of the computing base). As shown, the plastic layer 418 covers the magnetic element 416. In other examples, the plastic layer 418 may cover more or less of the surface of the post 414 than that shown in FIG. 4. The plastic layer 418 may have a tapered shape, as shown, which may provide a tight fit at the bottom of the post 414 when the post 414 is inserted into a corresponding opening in a computing device. The plastic layer 418 may be formed of any suitable plastic or plastic-like material comprised of moldable synthetic, semi-synthetic, or organic material. In some examples, the plastic layer 418 may be formed of a compressible material to further aid in providing a snug fit between the post 414 and the corresponding opening.

As shown, the post 414 may include at least one sidewall 428 having a tapered shape. In various examples, the tapered shape of the sidewall 428 may provide a fit that starts loose and then gradually increases in snugness as the post 414 mates with a corresponding opening of a computing device, as described more fully below. The post 414 may additionally or alternatively include a top portion 430 have a beveled surface, which may interlock with a beveled surface of a corresponding opening of a computing device to provide a snug fit at the top of the post 414.

Figure 5A:
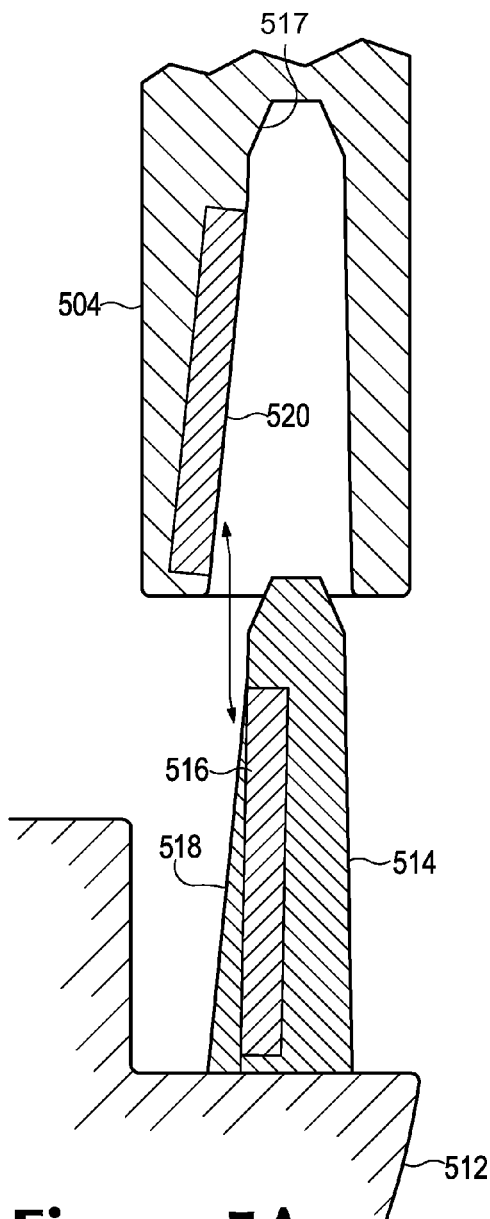
FIGS. 5A and 5B show detailed views of an example post with a magnetic element and an example opening with a magnetic element, in accordance with various implementations.
Figure 5B:
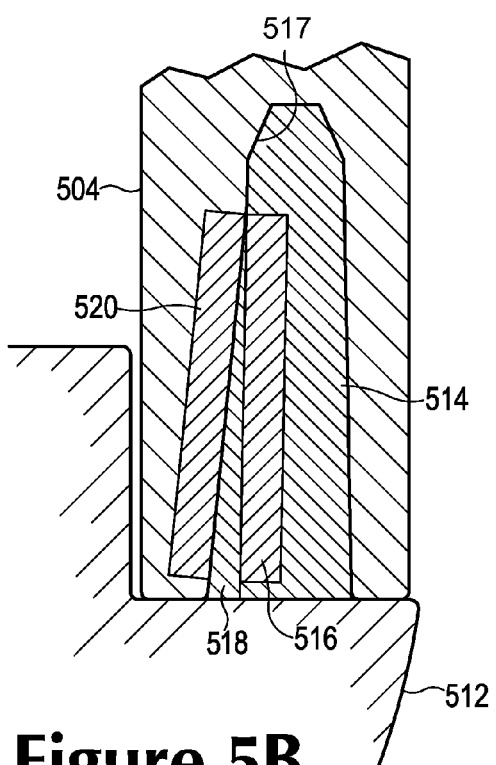

FIGS. 5A and 5B show detailed views of an example post 514 of a connection interface 512, and an example opening 517 of a computing device 504, both in accordance with various embodiments. The post 514 includes a magnetic element 516 and plastic layer 518, and the opening 517 includes a magnetic element 520. The sidewall and plastic covering 518 of the post 514 have a tapered shape, and the opening 517 includes a sidewall with a tapered shaped to correspond to the tapered shape of the post 514. The top portions of the post 514 and the opening 517 include correspondingly beveled surfaces, which may interlock to provide a snug fit at the top of the post 514 when the post 514 is mated with the opening 517. Though not explicitly shown here, the opening 517 may include a plastic layer in addition to or instead of the plastic layer 518 of the post, to help protect one or both of the magnetic elements 516, 520 from damage and/or to help provide a snug fit when the post 514 is mated with the opening 517.

As shown in FIG. 5A, as the opening 517 approaches the post 514, the magnetic elements 516, 520 may be provide an attractive force that helps draw the computing device 504 into the appropriate orientation for docking with the connection interface 512 of the computing base. As the post 514 enters the opening 517, the tapered shape of the sidewalls may provide a configuration such that the top of the post is narrower than the entrance to the opening 517, thus allowing a larger degree of tolerance when aligning the computing device 504 with the connection interface 512 that would be provide if the post 514 and the opening 517 were shaped more cylindrically.

As the post 514 continues to enter the opening 517, the fit gradually increases in snugness. As shown in FIG. 5B, once mated, the post 514 fits snugly into the opening 517.

Figure 6:
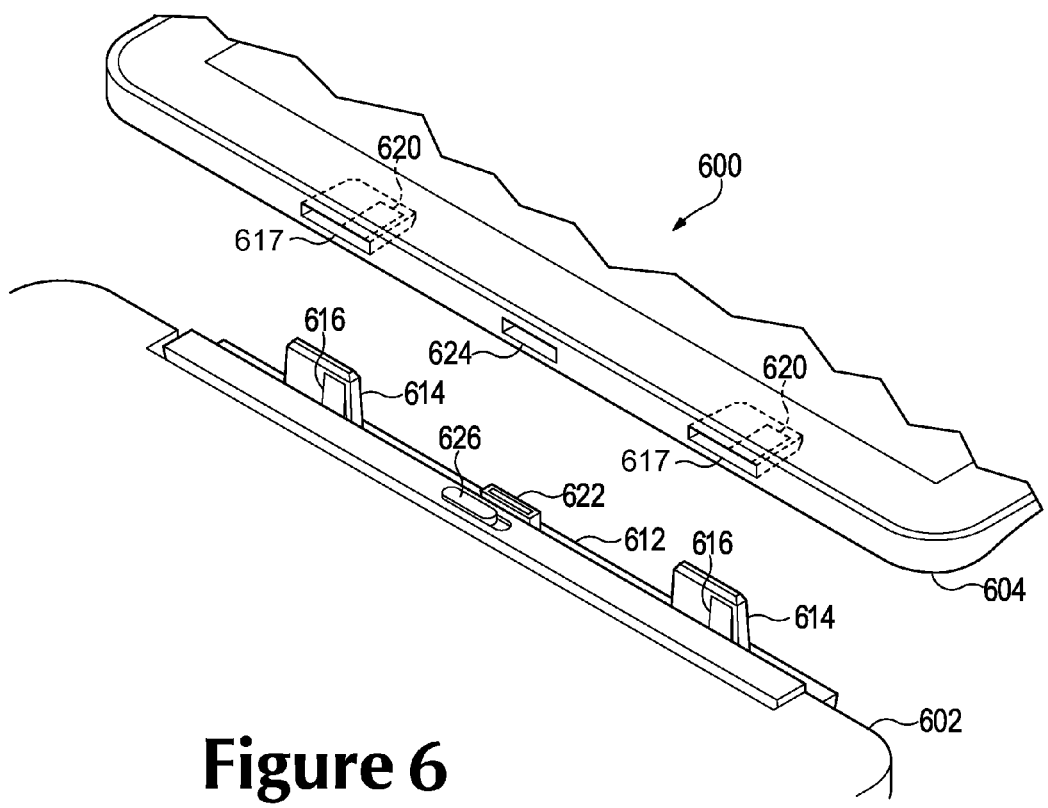
FIG. 6 shows a computing system including an example computing base having a post a magnetic element and an example computing device having an opening with a magnetic element, in accordance with various implementations.

FIG. 6 shows a computing system 600 including an example computing base 602 having a post 614 with a magnetic element 616, and an example computing device 604 having an opening 617 with a magnetic element 620, in accordance with various embodiments.

The computing device 604 may be any device configured to connect with the computing base 602. Examples of the computing device 604 may include, but are not limited to, handheld computers, tablet computers, display devices, digital recorders, smart phones, personal digital assistants, mobile phones, digital media players, televisions, or digital cameras. Likewise, the computing base 602 may be any device configured to connect with the computing device 604. Examples of the computing base 602 may include, but are not limited to, docking stations, keyboard docks, servers, set-top boxes, game consoles, digital media players, or digital cameras.

In various embodiments, the connection interface 612 of the computing base 602 may include a docking connector 622 and the computing device 604 may include a complementary docking port 624. The docking connector 622 and the docking port 624 may be configured to removeably couple the computing device 604 with the computing base 602. In various examples, the connection interface of the computing base 602 may include a release latch 626 to release the computing device 604 from the computing base 602. In other examples, the computing device 604 may instead include the release latch 626.

Various aspects of the illustrative embodiments are described herein using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

The phrases "in an example," "various examples" "in some examples," "in various embodiments," and "in some embodiments" are used repeatedly. The phrases generally do not refer to the same embodiments; however, they may. The terms "comprising" "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B, and C" means (A), (B), (C), (A and B), (A and C), (B and C), or (A, B and C). The phrase "(A) B" means (B) or (A and B), that is, A is optional.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed:

1. A computing system comprising:
a computing device having a first surface connected to a second surface, the first surface extending in a first direction and including a display, wherein the second surface is angled with respect to the first surface and has a smaller area as compared with the first surface, the second surface including an opening formed of a plurality of tapered sidewalls and a beveled top wall, and wherein a first magnetic element forms one of the plurality of sidewalls proximate to the opening; and
a base including a post to insert into the opening to facilitate docking of the computing device to the base, the post including a second magnetic element attracted to the first magnetic element to facilitate alignment of the post with the opening.

2. The computing system of claim 1, wherein the first magnetic element comprises an unmagnetized ferromagnetic material, an unmagnetized ferrimagnetic material, or an unmagnetized paramagnetic material, and wherein the second magnetic element comprises a magnet.

3. The computing system of claim 1, wherein the first magnetic element comprises a magnet, and wherein the second magnetic element comprises an unmagnetized ferromagnetic material, an unmagnetized ferrimagnetic material, or an unmagnetized paramagnetic material.

4. The computing system of claim 1, wherein a sidewall of the post is tapered, and wherein the second magnetic element extends a distance along a width of the post that is smaller than the width of the post.

5. The computing system of claim 1, wherein the post includes a plastic layer covering at least a portion of the second magnetic element.

6. The computing system of claim 5, wherein the plastic layer is tapered, wherein the post has a post surface, and wherein the plastic layer protrudes out from the post surface and extends a distance along a width of the post that is smaller than the width of the post.

7. The computing system of claim 1, wherein the first magnetic element forms, at least in part, the sidewall of the opening.

8. The computing system of claim 1, wherein a top portion of the post is beveled.

9. The computing system of claim 1, wherein the base includes a docking connector and the computing device includes a docking port, the docking connector and the docking port to removeably couple the computing device with the base.

10. The computing system of claim 1, wherein the base is a keyboard dock and the computing device is a tablet computer.

11. The computing system of claim 1, wherein the one of the plurality of sidewalls has a sidewall width and the first magnetic element has an element width, and wherein the sidewall width is larger than the element width.

12. A computing base comprising:
a body extending along a first direction; and
a connection interface to couple the computing base to a computing device, the connection interface including a post to insert into an opening of the computing device to facilitate aligning of the computing device to the computing base for docking, wherein the post extends from the body along a second direction that is different than the first direction and includes a tapered sidewall on which is provided a magnetic element, the post further including a plastic layer covering at least a portion of the magnetic element, and wherein the plastic layer is further tapered to facilitate insertion of the magnetic element into the opening of the computing device.

13. The computing base of claim 12, wherein the computing base is a selected one of a docking station, a keyboard dock, a server, a set-top box, a game console, a digital media player, or a digital camera.

14. The computing base of claim 12, wherein the connection interface includes a docking connector to couple the computing base to the computing device.

15. The computing base of claim 12, wherein the post has a post surface, and wherein the plastic layer protrudes out from the post surface and extends a distance along a width of the post that is smaller than the width of the post.

16. A computing device comprising:
a housing having a first surface connected to a second surface, the first surface extending in a first direction and including a display, wherein the second surface is angled with respect to the first surface and has a smaller area as compared with the first surface, the second surface including an opening formed of a plurality of tapered sidewalls and a beveled top wall, and wherein a first magnetic element forms one of the plurality of tapered sidewalls to mate with a second magnetic element positioned on a post of a computing base to facilitate aligning of the computing device to the computing base for docking.

17. The computing device of claim 16, wherein the computing device is a selected one of a handheld computer, a tablet computer, a display device, a digital recorder, a smart phone, a personal digital assistant, a mobile phone, a digital media player, a television, or a digital camera.

18. The computing device of claim 16, wherein the first magnetic element extends a distance along a width of the one of the plurality of tapered sidewalls that is smaller than the width of the one of the plurality of tapered sidewalls.

* * * * *